(12) United States Patent
Weese et al.

(10) Patent No.: US 7,010,164 B2
(45) Date of Patent: Mar. 7, 2006

(54) IMAGE SEGMENTATION

(75) Inventors: Juergen Weese, Henstedt-Ulzburg (DE); Vladimir Pekar, Hamburg (DE); Michael Kaus, Hamburg (DE)

(73) Assignee: Koninklijke Philips Electronics, N.V., Eindhoven (NL)

( * ) Notice: Subject to any disclaimer, the term of this patent is extended or adjusted under 35 U.S.C. 154(b) by 477 days.

(21) Appl. No.: 10/091,049

(22) Filed: Mar. 5, 2002

(65) Prior Publication Data

US 2002/0184470 A1    Dec. 5, 2002

(30) Foreign Application Priority Data

Mar. 9, 2001  (DE) ................................ 101 11 661
Jun. 14, 2001  (EP) ................................ 01202286

(51) Int. Cl.
*G06K 9/34*    (2006.01)

(52) U.S. Cl. ...................... 382/173; 382/203; 382/199; 382/295

(58) Field of Classification Search ................ 382/173, 382/190, 197, 266, 203, 195, 199, 267–269, 382/294–295, 300; 345/473
See application file for complete search history.

(56) References Cited

U.S. PATENT DOCUMENTS

| | | | |
|---|---|---|---|
| 5,654,771 A * | 8/1997 | Tekalp et al. ................ | 348/699 |
| 5,768,413 A * | 6/1998 | Levin et al. ................. | 382/173 |
| 6,078,680 A * | 6/2000 | Yoshida et al. ............. | 382/128 |
| 6,088,472 A * | 7/2000 | O'Donnell et al. ......... | 382/128 |
| 6,124,864 A * | 9/2000 | Madden et al. ............. | 345/473 |
| 6,201,543 B1 * | 3/2001 | O'Donnell et al. ......... | 345/420 |
| 6,404,920 B1 * | 6/2002 | Hsu ........................... | 382/190 |
| 2003/0099397 A1 * | 5/2003 | Matsugu et al. ............ | 382/173 |

FOREIGN PATENT DOCUMENTS

EP    1030191 A2    8/2000

OTHER PUBLICATIONS

Lurig et al: "Deformable surfaces for feature based indirect volume rendering" Computer Graphics International, 1998. Proceedings Jun. 22, 1998, pp. 752-760.

"An efficient 3D deformable model with a self-optimising mesh" by A.J. Bulpitt and N.E. Efford in Image and Vision Computing 14(1996) pp. 573-580.

* cited by examiner

*Primary Examiner*—Sanjiv Shah
*Assistant Examiner*—Ali Bayat

(57) ABSTRACT

A method of segmenting a selected region from a multi-dimensional dataset, which method comprises the steps of setting up a shape model representing the general outline of the selected region and setting up an adaptive mesh. The adaptive mesh represents an approximate contour of the selected region. The adaptive mesh is initialized on the basis of the shape model. Furthermore, the adaptive mesh is deformed in dependence on the shape model and on feature information of the selected region.

10 Claims, 1 Drawing Sheet

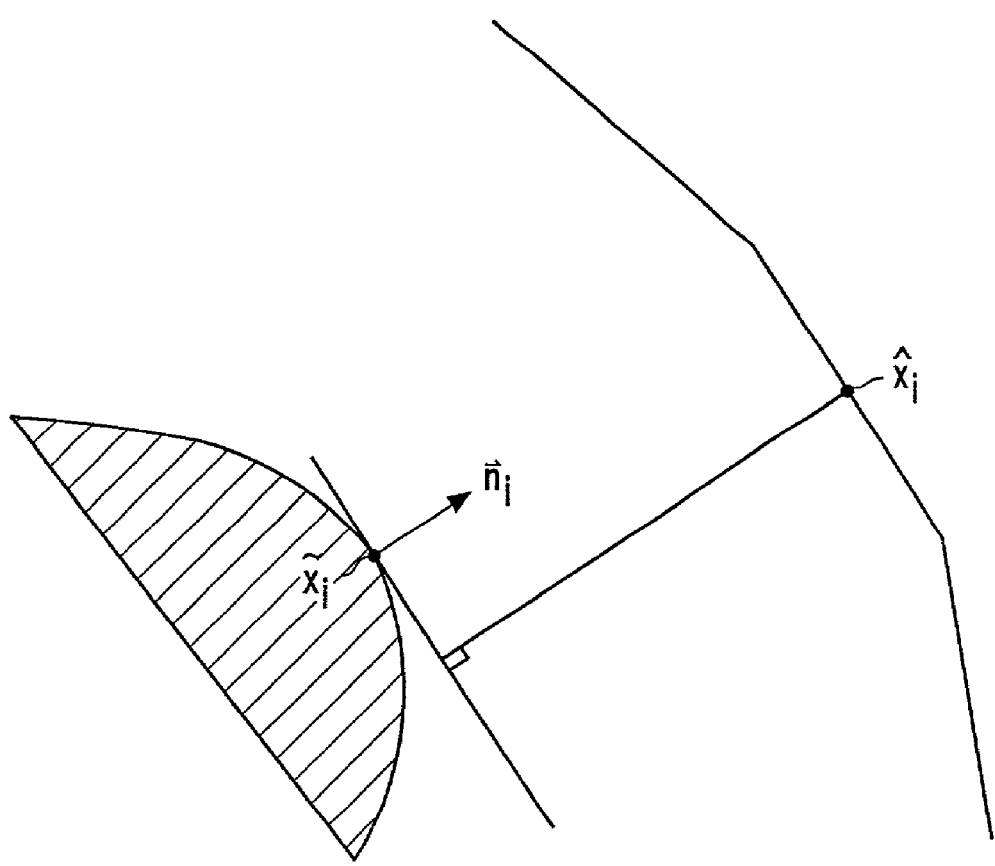

IMAGE SEGMENTATION

BACKGROUND OF THE INVENTION

Image segmentation generally concerns selection and/or separation of a selected part of a dataset. Such a dataset notably represents image information of an imaged object and the selected part relates to a specific part of the image. The dataset is in general a multi-dimensional dataset that assigns data values to positions in a multi-dimensional geometrical space. In particular, such datasets can be two-dimensional or three-dimensional images where the data values are pixel values, such as brightness values, grey values or color values, assigned to positions in a two-dimensional plane or a three-dimensional volume.

The invention relates to a method of segmenting a selected region from a multi-dimensional dataset, the method comprising the steps of
  setting-up a shape model representing the general outline of the selected region
  setting-up an adaptive mesh representing an approximate contour of the selected region
  which adaptive mesh is initialized on the basis of the shape model.

Such a method of segmenting a selected region from a three-dimensional dataset is known from the paper '*An efficient 3D deformable model with a self-optimising mesh*' by A. J. Bulpitt and N. E. Efford in Image and Vision Computing 14(1996) pp.573–580.

The known method operates on a multi-dimensional dataset in the form of a three-dimensional image. The known method employs a triangular mesh to represent a surface of the selected region. A so-called distance transform is used to initialize the adaptive mesh and when the mesh is close to its final solution, an image grey level gradient is used to drive the deformation of the mesh.

SUMMARY OF THE INVENTION

It is an object of the invention to provide a method of segmenting a selected region from a dataset, which method is computationally fast, more robust and more accurate than the conventional method.

This object is achieved by the method of segmenting a selected region from a dataset wherein according to the invention the adaptive mesh is deformed in dependence on the shape model and on feature information of the selected region.

The selection of the selected region may be effected by the initialization of the segmentation. In particular the initialization is done on the basis of the shape model. Such a shape model represents the selected region in terms of a parameterization of a priori shape information. This a priori shape information and the positioning of the shape model in the multi-dimensional dataset determine the region that is being selected. In particular, the shape model is an active shape model that allows for adaptation of its translation and orientation and pose, but also of shape parameters representing smaller details of the shape of the region that is represented by the active shape model. The adaptive mesh represents an approximate contour. The approximate contour represents an estimate of the boundary of the selected region relative to the remainder of the multi-dimensional dataset. The contour is in general a hypersurface in the multi-dimensional dataset, such as a surface or a curve. The contour has a dimension that is smaller than the dimensionality of the multi-dimensional dataset As the adaptive mesh is deformed, the approximate contour more accurately approaches the boundary of the selected region. According to the invention the adaptive mesh is deformed on the basis of feature information together with information from the shape model. The feature information, for example, concerns image features such as edges and surfaces of approximately equal data values. Such feature information is preferably represented by local gradients in the dataset, i.e. local relative changes of the data values. Strong gradients indicate the presence of boundaries and the direction of the gradients is locally perpendicular to the boundary. The shape model is employed during the successive steps of adaptation of the mesh. For example, the adaptive mesh is deformed on the basis of an internal energy and according to the invention the internal energy is defined in dependence on the shape model. Thus, information provided by the shape model is more effectively employed to drive the adaptive mesh to the actual boundary of the selected region. Notably image features in the multi-dimensional dataset which would drive the adaptive mesh to false boundaries, so-called false attractors, are substantially avoided, while a particularly close initialization is not required.

These and other aspects of the invention will be further elaborated with reference to the preferred implementations and embodiments as defined in the dependent claims.

Preferably, the shape model is updated upon deformation of the adaptive mesh. In particular the parameters of the shape model, such as the position, scale and pose, are adapted as the boundary is approached by the adaptive mesh.

In a further preferred implementation of the invention one or several local surface patches of the selected region are detected. An individual local surface patch is a small area tangent to the boundary of the selected region. In practice the local surface patch is taken as a small region transversely of to a local gradient in the neighbourhood of the current adaptive mesh. During mesh adaptation, detection takes place of boundaries which are in agreement with the adaptive mesh it is not considered whether they belong to the object to be segmented. Normally, some boundaries are correctly detected and others are misleading in the first few iterations of mesh adaptation. As the correct boundaries are more consistent with the model than the misleading boundaries, the fraction of correctly detected boundary points increases during mesh adaptation.

Subsequently, an individual vertex of the adaptive mesh is moved in the direction transversely of to the local surface patch at issue so as to deform the mesh. In this way it is avoided that the mesh is deformed in the direction of 'false attractors'.

Preferably, the deformation of the mesh is carried out in that individual vertices of the adaptive mesh are moved towards the surface patch in dependence on the angle between the local normal to the adaptive mesh and the local normal to the surface patch. The individual vertex is usually moved towards the surface patch that is closest to the vertex at issue. In this way the adaptive mesh is deformed while adequately taking into account available information on image features. Notably, the image features as represented by the orientation of the local surface patch is most relevant for deformation of the adaptive mesh while the avoiding influence of so-called false attractors. Particularly advantageous results are obtained when the vertices are moved essentially perpendicularly towards the local surface patches.

Furthermore, gradients in the dataset that have a magnitude smaller than a pre-set threshold value are advantageously discarded in forming the surface patches and in deformation of the adaptive mesh. Thus, deviations in the adaptive mesh deformation due to false attractors are avoided even further.

A preferred implementation of the adaptive mesh deformation is based on sp-termed energy functions. The term 'energy' in this respect is not related to a physical energy, but is used because the concept of a deformable adaptive mesh shows strong resemblance with a string of masses (the vertices) interconnected by springs (the bonds) moving in under the influence of a force field and striving towards a stable situation of minimum energy. In this resemblance, the external energy pertains to the external force field applied to the vertices and the internal energy pertains to the interaction between the vertices. Notably, the internal energy relates to the shape of the adaptive mesh. According to the invention, preferably the relative weight of the external energy relative to the internal energy is controlled by a parameter that may be adjusted by the user. This provides additional flexibility in implementing the deformation of the adaptive mesh in that the relative influences of the force fields and the shape of the adaptive mesh can be adapted. Preferably, the external energy is made dependent on feature information of the selected region relative to the actual configuration of the adaptive mesh. Thus, it is achieved that the external forces drive the adaptive mesh towards image features, such as strong boundaries, of the selected region. In order to control the shape of the adaptive mesh so as to resemble the shape of the selected region to a certain degree, the internal energy is advantageously dependent on the shape model. Thus it is avoided that the external forces cause the adaptive mesh to strongly deviate from the raw shape of the selected region. The co-operation of the internal energy and the external energy leads to fast, reliable and accurate convergence of the adaptive mesh with the actual boundary of the selected region. As the shape model is updated upon deformation of the adaptive mesh, the co-operation of the internal energy and the external energy is further improved in that the most updated information is employed and deviations due to false attractors are effectively avoided.

The invention also relates to a data processor for segmenting a selected region from a multi-dimensional dataset. The data processor according to the invention is defined in claim 9. The data processor according to the invention can to carry out the method according to the invention and notably avoids deviations due to false attractors.

The invention also relates to a computer program which includes instructions for segmenting a selected region from a multi-dimensional dataset. The computer program according to the invention is defined in claim 10. The computer program according to the invention is preferably loaded into the working memory of a data processor. The data processor is thus equipped to carry out the method of the invention. The computer program may be presented on a data carrier such as a CD-ROM. The computer program may also be present viz. over a network such as the world-wide web and can be downloaded into the working memory of the data processor from such a network.

These and other aspects of the invention are apparent from and will be elucidated with reference to the embodiments described hereinafter and with reference to the accompanying drawing.

BRIEF DESCRIPTION OF THE DRAWING

The sole FIGURE illustrates the deformation of the adaptive mesh as employed in the method of the invention.

DETAILED DESCRIPTION OF THE INVENTION

In a practical implementation of the method of the invention, a triangular adaptive mesh represents the deformable model. The adaptive mesh comprises N vertices with co-ordinates $\hat{x}_1, \ldots \hat{x}_N$. The adaptive mesh is adapted by way of an iterative procedure in which each iteration includes the following two steps:

1. surface detection so as to detect local surface patches of the selected region,
2. reconfiguration of the adaptive mesh so as to update the mesh in that the vertices of the mesh are moved towards the local surface patches. The reconfiguration of the mesh is done by minimizing the energy:

$$E = E_{ext} + \alpha E_{int}$$

The external energy $E_{ext}$ drives the adaptive mesh towards the surface patches obtained in the surface detection step. The internal energy $E_{int}$ restricts the flexibility of the adaptive mesh. The parameter $\alpha$ weights the relative influence of both terms.

The individual steps will now be discussed in more detail. Surface detection is carried out for the triangle centres $\hat{x}_i$ of the adaptive mesh. A search for surface patches is performed along the normal $\vec{n}_i$ of the triangle so as to find the point xti having the optimum combination of feature value F(x) and distance jδ to the triangle centre $\hat{x}_i$:

$$\tilde{x}_i = \hat{x}_i + \delta \vec{n}_i \arg\min_{j=-l,\ldots l} [Dj^2\delta^2 - F(\hat{x}_i + j\delta\vec{n}_i)]$$

Therein, the parameter D controls the combination of distance information and the feature value F(x), the parameter l defines the length of the profile searched for surface patches, and the parameter δ is the distance between sample points on the profile.

By combining feature value and distance information, surface points next to the adaptive mesh are given preference and the deformation of the adaptive mesh becomes much more stable as compared to detection of the point of maximum feature value. Thus, deviation due to false attractors is effectively avoided or reduced.

For example, the quantity $$F(x) = \pm \frac{g_{max}(g_{max} + \|g\|)}{g_{max}^2 + \|g\|^2} \vec{n} \cdot \vec{g} = \pm \vec{n} \cdot \vec{g} \begin{cases} 1 (\|g\| \leq g_{max}) \\ \frac{g_{max}}{\|g\|} (\|g\| \geq g_{max}) \end{cases}$$

is used as a feature value, where the sign is chosen in dependence on the brightness in the selected region with respect to its surroundings. For surface points with a gradient magnitude $\|g_i\|$ smaller than the threshold value $g_{max}$, this feature value is essentially the gradient in the direction of the local normal to the adaptive mesh. If the gradient value exceeds the threshold value, the feature value represents the scalar product of the local normal to the mesh and the gradient direction. Thus, the feature value takes into account the angle between the gradient and the local normal to the mesh.

Advantageously, the external energy has the form $$E_{ext} = \sum_{triangles} w_i \left[ \left( \frac{\vec{g}_i}{\|g_i\|} (\tilde{x}_i - \hat{x}_i) \right)^2 \right]$$

with the weights $$w_i = \max[0, F(\tilde{x}_i) - Dj^2 \delta^2]$$

This external energy causes the vertices of the adaptive mesh to move perpendicularly to the local surface patch as shown in the FIGURE.

A suitable choice of the internal energy is defined as follows. The starting point is a shape model represented by a mesh of triangles. The vertex co-ordinates of the mesh of the shape model are given by $$\vec{m}_i = \vec{m}_i^0 + \sum_{k=1}^{M} p_k \vec{m}_i^k$$

In this expression $m_i^0, \ldots m_i^N$ denote the vertex co-ordinates of the mean model, and $m_i^k, \ldots m_N^k$ describe the variation of the vertex co-ordinates associated with the eigenmodes (k=1, ... M) of the model, $p_i, \ldots p_M$ denote the weights of the eigenmodes.

The internal energy is conceived to maintain the distribution of vertices to some extent. Thus, pathological deformations due to false attractors are avoided. The internal energy is given as:

$$E_{int} = \sum_{vertices\ i} \sum_{neighbours\ j} \left\{ \vec{x}_i - \vec{x}_j - sR \left[ \vec{m}_i^0 - \vec{m}_j^0 + \sum_{j=1,\ldots M} p_k (\vec{m}_i^k - \vec{m}_j^k) \right] \right\}^2$$

where s and R represent the scale and orientation of the shape model.

The deformation of the adaptive mesh takes place in two steps. In the first step the scaling s and the orientation R of the shape model with the current weights $p_i$ of the eigenmodes are determined with respect to the current configuration of the adaptive mesh. Point-based registration methods based on singular value decomposition have been found to function appropriately in determining scaling and rotation. In the second step, the vertex co-ordinates xi and the weights $p_i$ are updated using the scaling s and the orientation R as determined in the first step. The energy function E is a quadratic function with respect to these parameters. Minimizing this energy is conveniently done by way of a conjugate gradient method which is known as such from the handbook 'Practical Optimisation' (Academic Press, San Diego 1981) by P. E. Gill et al. This method takes advantage of the fact that the matrix involved in the minimization is sparsely occupied.

The deformation of the adaptive mesh until convergence to the accurate approximation of the boundary of the selected region takes only a short time, that is, up to about 30s, which makes the segmentation according to the invention quite practical even in the event that large datasets are involved. Notably, such large datasets may occur in medical diagnostic applications where three-dimensional datasets with a high spatial resolution are employed. Good results are obtained especially in the segmentation of vertebrae from three-dimensional images of the human spine. If no steps were taken, this application is quite prone to false attractors formed by parts of neighboring vertebrae.

The invention claimed is:

1. A method of segmenting a selected region from a multi-dimensional dataset, which method comprises the steps of:
    setting-up a shape model representing a general outline of the selected region;
    setting-up an adaptive mesh representing an approximate contour of the selected region,
    which adaptive mesh is
    initialized and deformed based on the shape model, and
    on feature information of the selected region.

2. A method of segmenting a selected region as claimed in claim 1, wherein the step of setting-up the shape model includes updating the shape model upon deformation of the adaptive mesh.

3. A method of segmenting a selected region as claimed in claim 1, wherein the step of setting-up an adaptive mesh includes that
    one or more local surface patches of the selected region are detected, and
    the mesh is deformed in dependence on the local orientation of the mesh relative to the local surface patch(es).

4. A method of segmenting a selected region as claimed in claim 3, wherein the step of setting-up an adaptive mesh includes that
    the adaptive mesh includes vertices and links connecting individual vertices, and wherein
    the mesh is deformed in such a manner that individual vertices are moved towards respective surface patches.

5. A method of segmenting a selected region as claimed in claim 4, wherein individual vertices are moved in dependence on the angle between a local normal to the mesh and a normal to a surface patch.

6. A method of segmenting a selected region as claimed in claim 5, wherein individual vertices are moved in a direction normal to a surface patch.

7. A method of segmenting a selected region as claimed in claim 1, wherein the mesh adaptation is performed to optimize a value of an energy function, wherein
    the energy function includes an internal energy contribution that depends on the shape model, and
    an external energy contribution that depends on feature information of the selected region and the actual configuration of the adaptive mesh.

8. A method of segmenting a selected region as claimed in claim 7, wherein the energy function includes a weighted combination of the internal energy contribution and the external energy contribution, said contributions involving adjustable weight factors.

9. A data processor arranged to
    set-up a shape model representing a general outline of a selected region, and to
    set-up an adaptive mesh representing an approximate contour of the selected region, wherein the
    adaptive mesh is
    initialized and deformed on the basis of the shape model and
    on feature information of the selected region.

10. A computer program embodied in a computer-readable medium for implementing a set of computer instructions to set-up a shape model representing a general outline of a selected region, and to set-up an adaptive mesh representing an approximate contour of the selected region, wherein the adaptive mesh is initialized and deformed on the basis of the shape model, and on feature information of the selected region.

* * * * *